Patented Nov. 11, 1941

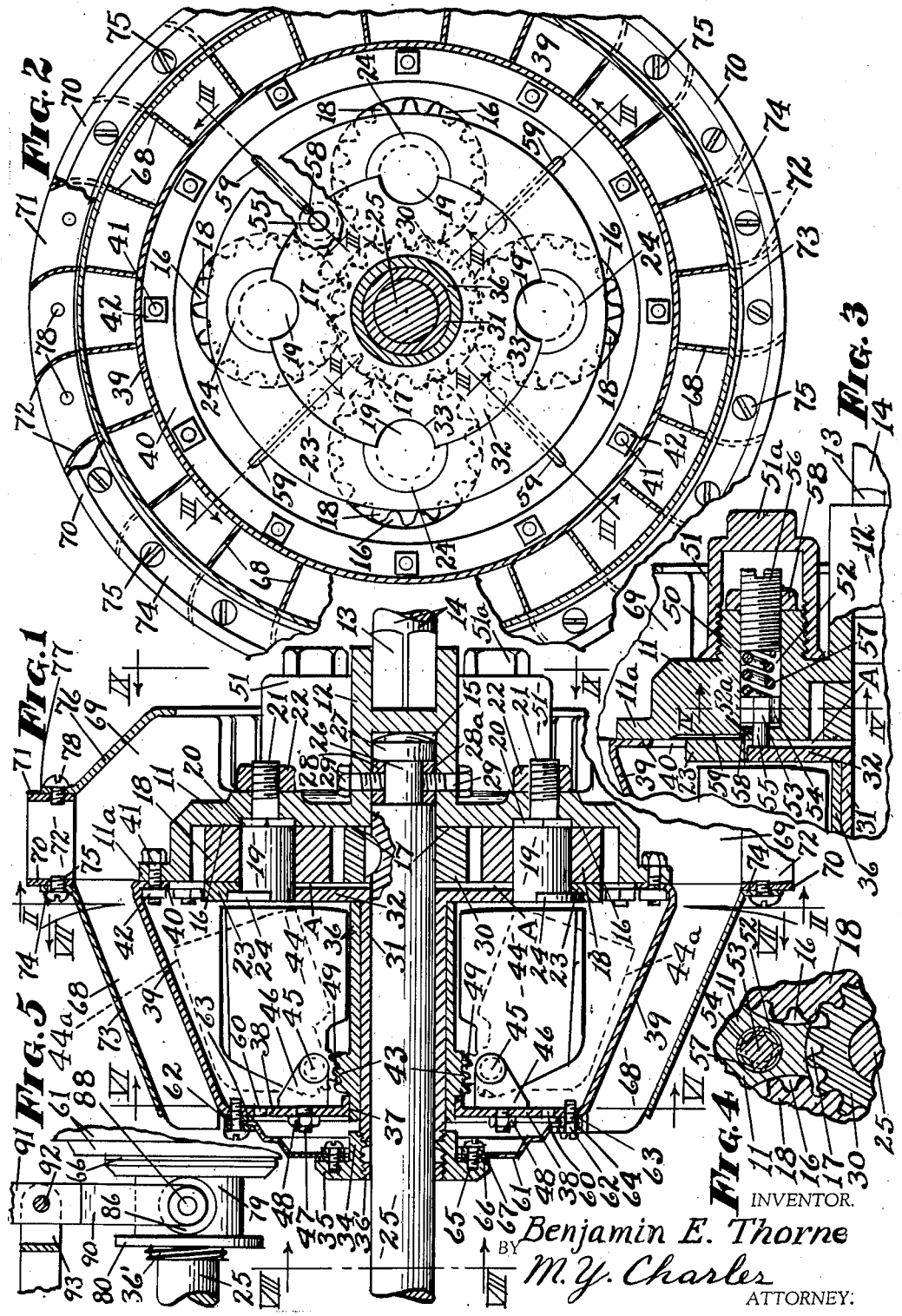
Nov. 11, 1941. B. E. THORNE 2,262,626
VARIABLE SPEED HYDRAULIC POWER TRANSMISSION AND CLUTCH
Filed May 3, 1940 3 Sheets-Sheet 1
INVENTOR.
Benjamin E. Thorne
BY M. Y. Charles
ATTORNEY.

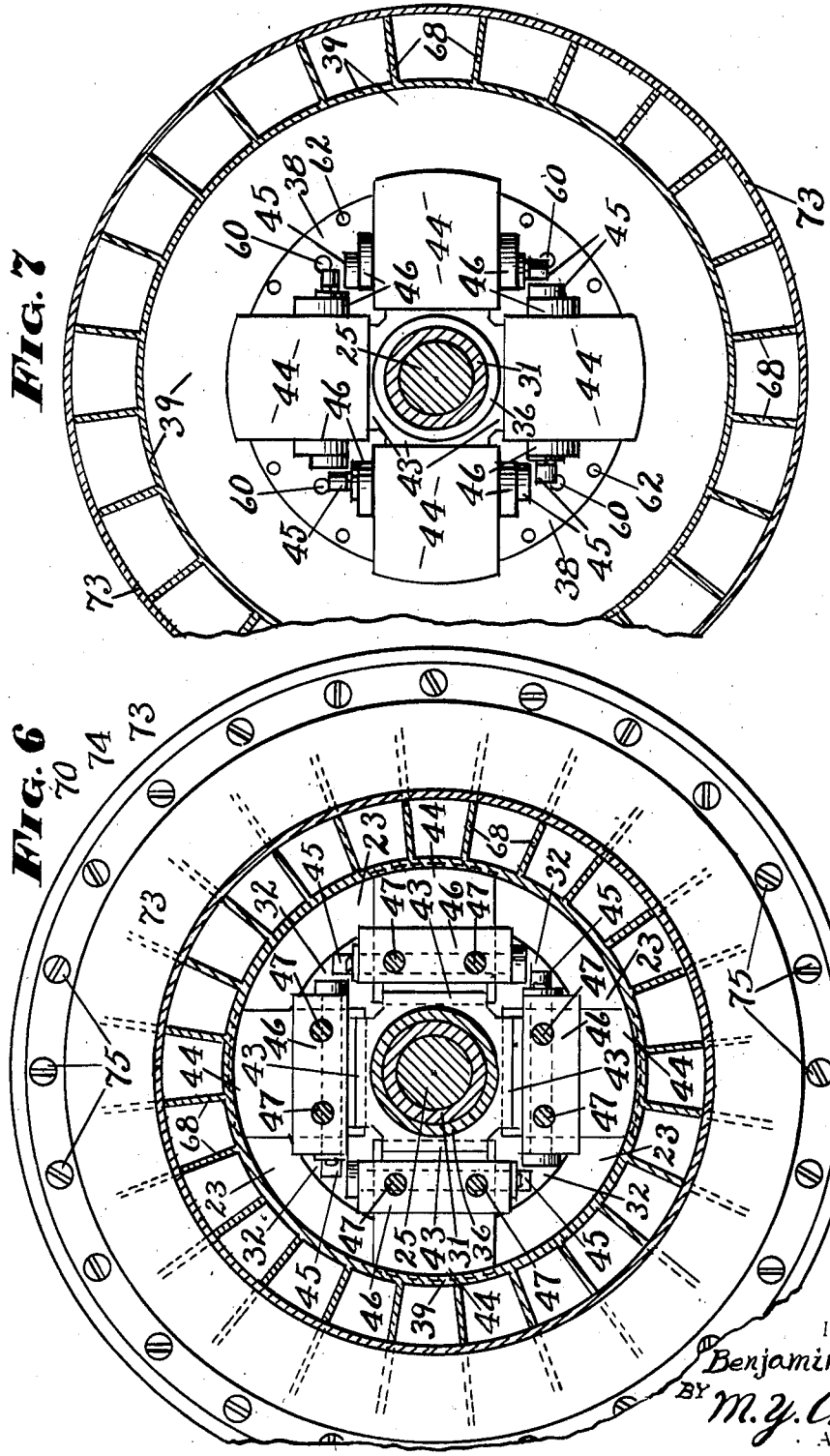

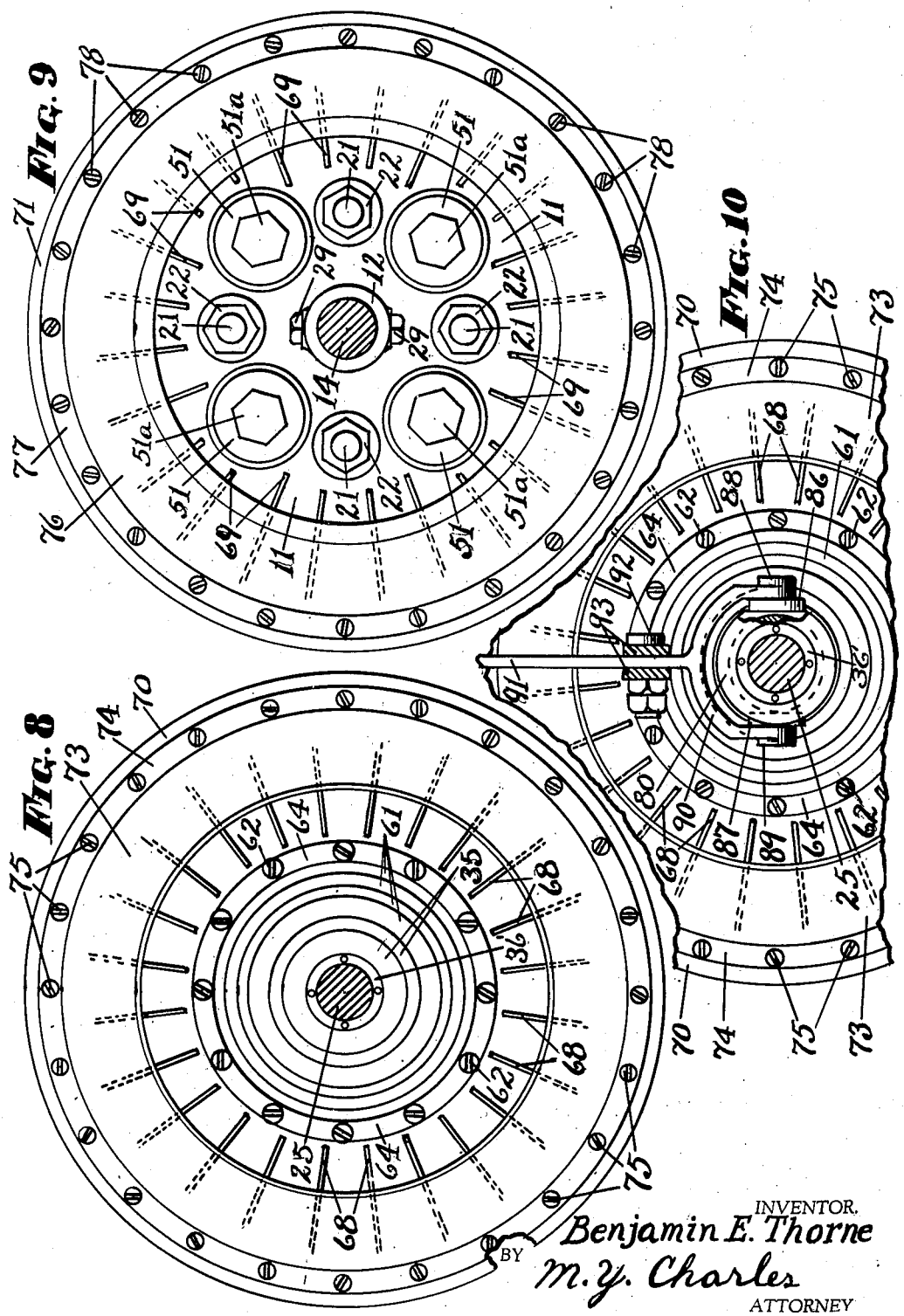

2,262,626

UNITED STATES PATENT OFFICE 2,262,626

VARIABLE SPEED HYDRAULIC POWER TRANSMISSION AND CLUTCH

Benjamin E. Thorne, Rose Hill, Kans.

Application May 3, 1940, Serial No. 333,141

7 Claims. (Cl. 192—61)

My invention relates to an improvement in hydraulic power transmissions, and has for its object to provide a transmission with a speed variable from zero to direct drive and which at the same time will serve the purpose of a clutch.

A further object is to provide a transmission of the kind mentioned that will operate automatically, or, if desired, the device may be manually operated.

A still further object is to produce a device of the kind mentioned that is simple, easy and cheap to make, extremely efficient in its work, long lived, one whose point of automatic operation is adjustable, and a device that is very compact.

Another object is to provide a device of the kind mentioned which, while designed as a power transmission and clutch device, the principles employed therein may be easily adapted for use as a brake for automotive or other purposes.

These and other objects will be more fully described as this description progresses.

Now referring to the accompanying drawings, Fig. 1 represents a longitudinal sectional view through the device as designed for automatic operaion.

Fig. 2 is a cross sectional view through the device, the view being taken along the line II—II in Fig. 1 and looking in the direction of the arrows.

Fig. 3 is a longitudinal view through one of the several duplicate devices for adjusting the point of speed at which the automatic operation of the device takes effect. The view being taken along the lines III—III in Fig. 2 and looking in the direction of the arrows.

Fig. 4 is a detail cross sectional view taken along the line IV—IV in Fig. 3 and looking in the direction of the arrows.

Fig. 5 is a side view of the manual operating device for the transmission and clutch.

Fig. 6 is a cross sectional view of the device, the view being taken along the line VI—VI in Fig. 1 and looking in the direction of the arrows.

Fig. 7 is a cross sectional view of the device, the view being taken along the line VII—VII in Fig. 1 and looking in the direction of the arrows.

Fig. 8 is a front view of the device, the view being taken along the line VIII—VIII in Fig. 1 and looking in the direction of the arrows.

Fig. 9 is a rear view of the device, the view being taken from approximately along the line IX—IX in Fig. 1 and looking in the direction of the arrows.

Fig. 10 is a front view of the device as designed for manual operation of the device.

Similar numerals of reference designate the same parts throughout the several figures of the drawings.

In the drawings is shown my improved hydraulic transmission and clutch device in which 11 represents a plate element having a hub portion 12 integrally formed thereon and extending rearwardly therefrom.

The outer end of the hub 12 is provided with a hole that is axially positioned therein and which is so formed as to receive the deformed end 13 of a shaft 14 so that the shaft 13—14 will not turn in the hub 12 and will be revolvably driven thereby. In the inner portion of the hub 12 is a round hole 15 which extends to the inner face of the plate 11 and is axially positioned therein to form a bearing as will later be described.

The inner portion of the plate 11 is provided with circular milled recesses 16 positioned in a cruciform position and spaced equidistant from the center axis of the plate 11 and around and joining into a central axially positioned milled circular recess 17.

In each of the outer circular recesses is revolvably mounted a gear wheel 18 on a pin 19 that has a square base 20 that is seated in a square recess in the plate 11. The pin 19 is provided with a reduced extension portion 21 that passes through the plate 11 and on which is threaded a nut 22 to rigidly bind and hold the pin 19 on the plate 11.

At 23 is a flat ring element that lays partly over the pump gears 18 and on the metal body intermediate the pump gears 18 and is rigidly held in place by partial heads 24 on the pins 19, the heads 24 being countersunk in the ring 23 as shown in Fig. 1.

At 25 is a drive shaft. The inner end of the shaft 25 is journaled in the bearing 15. At 26 is shown a reduced portion of the shaft 25, and at 27 is a head portion that is integrally formed on the inner end of the reduced portion 26 of the shaft 25.

Around the reduced portion 26 of the shaft 25 is a pair of half circle bearing segments 28 and 28a that are positioned between the full size portion of the shaft 25 and the head 27 and which are rigidly held in place by bolts 29 that pass through the hub 12 and are threaded into the bearing segments 28 and 28a. This arrangement serves to prevent end movement of the shaft 25.

At 30 is a pump gear that is rigidly mounted on the shaft 25 and is revolvably positioned in the milled recess 17 and which is in mesh with each of the pump gears 18.

It will be understood that all the pump gears closely fit against the walls of their respective milled recess for pump purposes in the usual manner.

Revolvably and longitudinally slidable on the shaft 25 is a sleeve element 31 on which is integrally formed a circular plate 32 that closely and slidably fits within the ring element 23 and is provided with circular shaped notches 33 that fit around that portion of the outer end of the pins 19 where the head 24 does not extend. On the outer end of the sleeve is threaded a packing gland element 34 that is provided with an outwardly extending flange 35, the object of which will later be explained. At 36' is a packing nut that is threaded into the packing gland 34 so as to press a packing placed within the packing gland 34 and around the shaft 25.

Slidable longitudinally on the sleeve 31 is mounted a second sleeve element 36, one end of which abuts the plate 32 and the other end slides longitudinally in a close fitting bearing 37 formed in the front plate 38 of a conical shaped housing element 39 that has an inwardly turned flange 40 that is rigidly attached to a flange element 11a by means of bolts 41 that pass through the flanges 11a and 40 and are threaded into nuts 42 that are welded to the flange 40.

On the outer portion of the sleeve element 36 is integrally formed four rack gears 43 that are spaced ninety degrees apart around the sleeve 36.

At 44 is shown four weights that are spaced ninety degrees apart around the sleeve element 36 and are pivotally mounted at their lower and outer corner portion on a pin 45 that is carried in brackets 46 that are rigidly mounted on the plate 38 by means of bolts 47 that are formed on the bracket 46 and pass through the plate 38 whereupon nuts 48 are threaded thereon to rigidly bind and hold the brackets 46 on the plate 38.

On the weights 44 and adjacent the pins 45 is formed gear teeth 49 that are in mesh with the rack gear teeth 43 for reasons that will later be made obvious.

In the plate 11 and intermediate each of the pump gears 18 (see Figures 2, 3 and 4), is a spring urged device for moving the plate 32 and sleeve 31 outwardly from the pump gears 18 and 30. Each of the devices comprises a boss 50 that is formed on, and projects rearwardly from the plate 11. The outside of the boss 50 is threaded and a cap 51 is threaded thereon in such a manner as to form an oil tight joint between the cap 51 and the plate 11. The cap 51 is provided with a multi-sided head 51a as a wrench hold by which the cap 51 may be turned.

In the boss 50 and plate 11 is a bore 52 that reaches within a short distance of the opposite face of the plate 11, and from there on is a smaller bore 52a that reaches the balance of the way through the plate 11.

In the bore 52 is a piston-like element 53 that has depressed portions 54 therein to admit the passage of oil as will later be explained. At 55 is a pin element integrally formed on the piston like element 53 and slidably passes through the small bore in the plate 11.

At 56 is an adjusting screw positioned in the bore 52 and threaded into the boss 50. Intermediate the piston like element 53 and the inner end of the adjusting screw 56 is positioned a helical compression spring 57. At 58 is a lock nut threaded on the adjusting screw 56 and which is adapted to engage the outer end of the boss 50 as a means of locking the adjusting screw 56 in its adjusted position.

The outer end of the pin 55 rests against the plate 32 so that the pressure of the spring 57 is exerted against the plate 32 to urge movement of the plate 32 away from the pump gears 18 and 30.

At 58 is a small hole through the plate 11 and opening into the bore 52 and connecting with an oil groove 59 in the inner face of the plate 11 and leading to a point outside the ring 23.

In the plate 38 is shown holes 60 through which oil may pass as will later be described.

At 61 is shown a circular flexible diaphragm the outer edge is attached by means of screws 62 to the plate 38, there being a gasket 63 between the diaphragm 61 and the plate 38 to form an oil tight joint between the diaphragm 61 and the plate 38, and at 64 is a stiff ring element on the outside of the outer edge of the diaphragm and through which the screws 62 pass to further insure a tight joint between the diaphragm 61 and the plate 38.

The inner edge of the diaphragm 61 is attached to the flange element 35 by means of screws 65. Between the inner edge of the diaphragm 61 and the flange element 35 is a gasket 66, and at 67 is a stiff ring element on the other side of the diaphragm 61 through which the screws 65 pass so as to insure an oil tight joint between the flange element 35 and the inner edge of the diaphragm 61.

On the outside of the sloping wall 39 of the housing elements 38—39 is a series of fin elements 68 equally spaced apart around the center axis of the shaft 25 and in longitudinal alignment therewith. The fins 68 being integrally formed on, or welded to the wall element 39 for heat radiation purposes that will later be explained.

At 69 is a second series of fin elements that are integrally formed on, or welded to the back side of the plate 11 for heat radiating purposes that will later be explained. The fins 69 are equally spaced around the center axis of the shaft 14 and in longitudinal alignment therewith and in registry with the fins 68 and the adjacent edges of the fins 68 and 69 abutting each other.

Over the outer corners of the fins 68 and 69 is positioned fin elements 72 that are rigidly attached to, or integrally formed as a part of the ring elements 70 and 71. Each fin element 72 abuts the adjacent edge of its respective fin element 69 so as to make a composite fin assembly of the fins 68, 69 and 72 that spans the housing 39 and the outer edge and rear face of the plate 11 for heat radiating purposes that will later be described.

At 73 is a conical shaped housing element having a flange portion 74. The housing 73 is slipped over, and rests on the outer edges of the fins 68 and the flange 74 lays against the side of the ring 70 and is rigidly attached thereto by means of screws 75. This arrangement forms a series of sloping open ended air passages defined by the fins 68 and the housing elements 39 and 73.

At 76 is a second conical shaped housing element having a flange portion 77. The housing element 76 is positioned over, and rests on the outer edges of the fins 69 and the flange 77 lays against the side of the ring 71 and is rigidly attached thereto by means of screws 78. This arrangement forms a series of upwardly extending open ended air passages defined by the fins 69 and the rear side and edge of the plate 11 and the conical shaped housing element 76.

These air passages defined by the fins 68 and 69 and their adjacent elements discharge into the spaces between the fins 72 and their supporting rings 70 and 71 for the movement of air as will later be explained.

In Figures 5 and 10 is shown a device for the manual operation of the transmission and clutch device above described. This device comprises the addition of a sleeve element 79 that is integrally formed on the flange element 35 and on the outer end of the sleeve portion 79 is a flange portion 80 that is integrally formed on the sleeve element 79 so as to form a channel formation 80—79—35.

In the channel formed by the elements 80—79—35 and on opposite sides of the sleeve 79 is a pair of rollers 86 and 87 and are revolvably mounted on pivot pins 88 and 89 that are rigidly mounted on the ends of a yoke element 90 that is integrally formed on a lever element 91 that is pivotally mounted at 92 on a supporting element 93.

The automatic operation of the device is as follows:

The enclosure formed by the plate 11, housing and plate elements 39 and 38 is filled with liquid, preferably oil. The shaft 25 is the drive shaft, and the shaft 14 is the shaft that is to be driven.

The plate 32 is normally sufficiently spaced at A from the pump gears 18 and 30 that the gears may be freely revolved at low speeds and the oil pumped by the gears 18 and 30 will flow freely between the gears and the plate 32 without driving the shaft 14.

Now if the speed of the shaft 25 and parts positively driven thereby be increased, the pump gears will pump more oil than can easily be circulated between the gears and the plate 32 whereupon the shaft 14 will be influenced to turn. Simultaneously with this action the weights 44 under the influence of centrifugal force will be thrown from their normal position shown in Fig. 1 to the dotted position 44a. During this movement the gear teeth 49 acting in the rack gear teeth 43 moves the sleeve 36 toward the pump gears 18 and 30, and the inner end of the sleeve 36 abutting the plate 32 also moves the sleeve 31 and plate 32 toward the pump gears 18 and 30 to close the space A between the plate 32 and the gears 18 and 30 whereupon at the completion of this movement, the gears 18 and 30 are positively hydraulically locked against rotation and the shaft 14 is driven at the same rate of speed as that of the shaft 25.

As the plate 32 was moved toward the pump gears 18 and 30, it was so moved against the resisting pressure of the oil being discharged from the pump and also the pressure of the springs 57. Now if the speed of the device be reduced, the combined pressure of the oil discharged and the springs 57 will overcome the pressure developed by the centrifugal force of the weights 44 and the plate 32 will be moved away from the pump gears 18 and 30 whereupon the oil pumped by the gears will be allowed to freely circulate through the space A and the shaft 14 may stand still.

The speed at which the weights 44 under the influence of centrifugal force will operate to close the discharge passage of the drum may be increased or decreased by increasing or decreasing the pressure exerted on the plate 32 by the springs 57. This pressure may be adjusted by screwing the adjusting screws 56 in or out and then locking the screws 56 in their adjusted position by means of the lock nut 58 as will be readily understood.

As the above described movements of the plate 32 are effected there will also be longitudinal movements of the pin and piston elements 53 and 55. In as much as the space enclosed by the housing 38—39 and plate 11 is filled with liquid, the bore 52 will also contain liquid, and as the movements of the pin and piston 53 and 55 occur, the liquid will pass through the depression 54 in the piston 53, and if further movement of the liquid becomes necessary the movement may take place through the hole 58 and groove 59.

Due to the movements of the sleeves 36 and 31 and the plate 32 there may be some slight displacement of oil, and the displaced oil will pass through the holes 60 into the space between the plate 38 and the diaphragm element 61 which, due to its flexibility will bulge or give enough to make space to receive the displaced oil.

Due to the stoppage, or near stoppage, of the circulation of the liquid under the above described movements of the plate 32, the liquid involved in clutching or locking the gears 18 and 30 for the variable or direct transmission of power may become heated due to the movement and pressure applied thereto. This heat will be absorbed by the plate 11 and other adjacent parts of the device and eventually find its way into the fin elements 68—69 and 72.

Now as the entire mechanism is revolved, air, under the influence of centrifugal force and the blower characteristics formed by the housing wall 39, plate 11, cone shaped walls 73 and 76 and fin elements 68, 69 and 72 will flow in a strong draft through the air passages formed by the fins 68 and 69, and the walls 39 and 73, and the plate 11 and wall 76, and be discharged outwardly past the fins 72. During this rapid movement of air through these air passages the heat from the liquid, above mentioned, will be radiated from the fins 68 and 69 and wall 39 and plate 11 into the flowing air and be carried away and thereby avoid any excessive heating of the liquid carried in the device.

There may be instances where it would be desirable to have a manual control over the device in addition to the automatic control. This feature may be had by the addition of the parts shown in Fig. 5.

These features having been added, the operation of the device is the same as above described, except that by the throwing of the lever 91 the movements of the sleeve 31 and plate 32 may be effected at times other than those when these movements would be effected by the weights 44.

In view of this arrangement it is obvious that the pump gears 18 and 30 may be either liberated, partially seized or entirely locked at will, regardless of speed, and independently of the automatic action.

Such modifications of my invention may be employed as lie within the scope of the appended claims without departing from the spirit and intention of my invention. Now having fully described my invention, what I claim is:

1. In a variable speed hydraulic power transmission and clutch; a drive shaft, a driven shaft, a plate element and a housing element carried by said plate, means on said plate for receiving and positively driving said driven shaft, means in said plate for revolvably receiving and holding said drive shaft, a multi-gear hydraulic pump, said pump having a drive gear and a plurality of driven gears, said drive gear being rigidly carried on said drive shaft and being in mesh with each of the driven gears, said drive gear and driven gears being revolvable in recesses in said plate that forms the edge and one side of the pump housing, a second plate, said second plate forming the other side of said pump housing and being movable toward and away from said gears so as to provide a variable sized passage, or eliminate the passage for the hydraulic discharge of said pump so as to determine the speed of rotation of the said gears and also to effect the rotary movement of the first said plate and driven shaft in speeds proportional to the variable sizes of the discharge passage of the pump.

2. In a variable speed hydraulic power transmission and clutch as defined in claim 1, the second said plate being movable under the influence of weights that are moved under the influence of centrifugal force, and springs that exert pressure against the second said plate in opposition to the force applied to the second said plate by said weights and means for manually moving the second said plate toward and away from the pump gears.

3. In a variable speed hydraulic power transmission and clutch as defined in claim 1, and means on the outside of the first said plate and housing carried thereon for effecting the movement of air along the outside surface of the first said plate and the said housing carried thereon for cooling purposes of the device.

4. In a variable speed hydraulic power transmission and clutch; a drive shaft, a driven shaft, a plate element and a housing element carried on said plate, means on said plate to receive and drive said driven shaft, and means in said plate for revolvably receiving and holding said drive shaft, a multi-gear hydraulic pump, said pump having a drive gear and a plurality of driven gears, said drive gear being rigidly mounted on the said drive shaft and being in mesh with each of the driven gears, said drive gear and the driven gears being revolvably in recesses in said plate that forms the edge and one side wall of the pump housing, a second plate, said second plate forming the other side of the said pump housing and being movable toward and away from the pump gears so as to provide a variable sized passage, or eliminate the passage for the hydraulic discharge of the said pump so as to determine the speed of rotation of the said gears and also to effect the rotary movement of the first said plate and driven shaft in speeds proportional to the variable size of the discharge passage of the pump, a sleeve element rigidly connected with the second said plate, said sleeve element being positioned around the drive shaft and being slidable longitudinally thereon and extending outside of the said housing element, and means carried by said sleeve for holding a packing around said drive shaft, and a flexible closure element connecting between the said housing element and the said packing holding device, and spring means carried in the first said plate for engaging and urging movement of the second said plate away from the pump gears, and means connecting with the outer end of said sleeve for moving said sleeve and the first said plate toward and away from the pump gears to effect the variable speed of driving and final grasping of the clutch to drive the first said plate and driven shaft as described.

5. In a variable speed hydraulic power transmission and clutch; a drive shaft, a driven shaft, a plate element and a housing element carried on said plate, means on said plate to receive and drive said driven shaft, and means in said plate for revolvably receiving and holding said drive shaft, a multi-gear hydraulic pump, said pump having a drive gear and a plurality of driven gears, said drive gear being rigidly mounted on the said drive shaft and being in mesh with each of the driven gears, said drive gear and the driven gears being revolvable in recesses in said plate that forms the edge and one side wall of the pump housing, a second plate, said second plate forming the other side of the said pump housing and being movable toward and away from the pump gears so as to provide a variable sized passage, or eliminate the passage for the hydraulic discharge of the said pump so as to determine the speed of rotation of the said gears and also to effect the rotary movement of the first said plate and driven shaft in speeds proportional to the variable size of the discharge passage of the pump, a sleeve element rigidly connected with the second said plate, said sleeve element being positioned around the drive shaft and being slidable longitudinally thereon and extending outside of the said housing element, and means carried by said sleeve for holding a packing around said drive shaft, and a flexible closure element connecting between the said housing element and the said packing holding device, and spring means carried in the first said plate for engaging and urging movement of the second said plate away from the pump gears, a second sleeve element, said second sleeve element being positioned around the first said sleeve element and being revolvable and slidable longitudinally thereon, one end of the second said sleeve abutting the second said plate, the other end of the second said sleeve having a plurality of rock gears thereon, a plurality of weights, said weights being spaced equally around the center axis of the said drive shaft and said sleeves and being pivotally mounted, one corner in bearings carried by the said housing element, said weights having gear teeth thereon and in mesh with the said rack gear teeth, said weights being so mounted in said bearings that the free ends thereof will move outwardly under the influence of centrifugal force and the gear teeth thereon will co-act with the rack gear teeth to move the second said sleeve and the second said plate toward the said pump gears for the purpose described.

6. In a variable speed hydraulic power transmission and clutch device as defined in claim 1, and groove means in said drive shaft, and ring means seated in said groove and rigidly attached to the bearing element for said drive shaft for preventing end movement of the said drive shaft.

7. In a variable speed hydraulic power transmission and clutch; a drive shaft, a driven shaft, a plate element and a housing element carried by said plate, means on said plate for receiving and positively driving said driven shaft, means in said plate for revolvably receiving and holding said drive shaft, a multi-gear hydraulic pump, said pump having a drive gear and a plurality of driven gears, said drive gear being rigidly carried on said drive shaft and being in mesh with each of the driven gears, said drive gear and driven gears being revolvable in recesses in said plate that forms the edge and one side of the pump housing, a second plate, said second plate forming the other side of said pump housing and being movable toward and away from said gears so as to provide a variable sized passage, or eliminate the passage for the hydraulic discharge of said pump so as to determine the speed of rotation of the said gears and also to effect the rotary movement of the first said plate and driven shaft in speeds proportional to the variable sizes of the discharge passage of the pump, the second said plate being movable under the influence of weights that are moved under the influence of centrifugal force, and springs that exert pressure against the second said plate in opposition to the force applied to the second said plate by said weights, and means for adjusting the degree of pressure exerted by said springs on the second said plate.

BENJAMIN E. THORNE.